(12) United States Patent
Pozgay et al.

(10) Patent No.: US 7,183,969 B2
(45) Date of Patent: Feb. 27, 2007

(54) SYSTEM AND TECHNIQUE FOR CALIBRATING RADAR ARRAYS

(75) Inventors: Jerome Howard Pozgay, Marblehead, MA (US); Wesley Thomas Dull, Chelmsford, MA (US)

(73) Assignee: Raytheon Company, Waltham, MA (US)

( * ) Notice: Subject to any disclaimer, the term of this patent is extended or adjusted under 35 U.S.C. 154(b) by 254 days.

(21) Appl. No.: 11/022,028

(22) Filed: Dec. 22, 2004

(65) Prior Publication Data

US 2006/0132357 A1 Jun. 22, 2006

(51) Int. Cl.
G01S 7/40 (2006.01)
G01S 13/66 (2006.01)

(52) U.S. Cl. .......... 342/174; 342/59; 342/189; 342/145

(58) Field of Classification Search ........ 342/174
See application file for complete search history.

(56) References Cited

U.S. PATENT DOCUMENTS

| | | |
|---|---|---|
| 3,128,466 A | 4/1964 | Brown et al. |
| 3,316,549 A | 4/1967 | Hallendorff |
| 3,569,965 A | 3/1971 | Bagley |
| 3,858,214 A | 12/1974 | Jones, Jr. |
| 3,938,148 A | 2/1976 | Hobson |
| 3,940,767 A | 2/1976 | DeLano et al. |
| 4,011,564 A | 3/1977 | Gulick, Jr. |
| 4,190,837 A | 2/1980 | Salvaudon et al. |
| 4,212,012 A | 7/1980 | Manoogian et al. |
| 4,241,889 A | 12/1980 | Schwellinger et al. |
| 4,256,275 A | 3/1981 | Flick et al. |
| 4,290,066 A | 9/1981 | Butler |
| 4,303,211 A | 12/1981 | Dooley et al. |
| 4,586,044 A | 4/1986 | Hopwood et al. |
| 4,688,042 A | 8/1987 | Cronson et al. |
| 4,766,435 A | 8/1988 | Wells |
| 4,968,967 A | 11/1990 | Stove |
| 5,163,176 A | 11/1992 | Flumerfelt et al. |
| 5,345,239 A | 9/1994 | Madni et al. |
| 5,400,035 A | 3/1995 | Liu |
| 5,673,051 A | 9/1997 | Nussbaum et al. |
| 6,225,942 B1 | 5/2001 | Alon |
| 6,295,017 B1 | 9/2001 | Ivanov et al. |
| 6,320,541 B1 | 11/2001 | Pozgay et al. |
| 6,335,705 B1* | 1/2002 | Grace et al. ............ 343/703 |
| 6,340,947 B1* | 1/2002 | Chang et al. .......... 342/357.01 |
| 6,359,586 B1* | 3/2002 | Sviestins ............ 342/451 |
| 6,518,917 B1 | 2/2003 | Durfee et al. |
| 2005/0001760 A1* | 1/2005 | Mrstik ................ 342/174 |
| 2006/0114147 A1* | 6/2006 | Boonstra et al. .......... 342/174 |

FOREIGN PATENT DOCUMENTS

FR 2 586 109 A1 7/1987
GB 2 292 493 A 2/1996

OTHER PUBLICATIONS

Nabaa, N. Bishop. "Solution to a Multisensor Tracking Problem with Sensor Registration Errors". IEEE Transactions on Aerospace and Electronic Systems, vol. 35, Issue 1. Jan. 1999. pp. 354-363.*

(Continued)

Primary Examiner—Thomas H. Tarcza
Assistant Examiner—Matthew M. Barker
(74) Attorney, Agent, or Firm—Daly, Crowley, Mofford & Durkee, LLP

(57) ABSTRACT

A system and technique for calibrating a plurality of radars provides a set of simultaneous equations derived from monostatic echo returns from a plurality of targets. A solution of the simultaneous equations provides relative position calibration factors and time delay calibration factors associated with the plurality of radars. The relative position calibration factors and the time delay calibration factors allow the plurality of radars to be coherently combined with only a small amount of processing gain loss compared with an ideal coherent processing gain.

33 Claims, 8 Drawing Sheets

OTHER PUBLICATIONS

PCT Search Report of the ISA for PCT/US00/03892 dated Oct. 13, 2000.

Hoffman; et al.; "Four-Channel Monopulse for Main Beam Nulling and Tracking;" XP000697852: Proceedings of the IEEE National Radar Conference, New York; May 13, 1997; pp. 94-98.

Sherman; "Monopulse Principles and Techniques;" XP-002148537, Section 12.2 "The Diagonal Difference Signal;" Dedham Artech House Inc. 1984; pp. 339-343.

PCT Search Report & Written Opinion for PCT/US2005/045094 dated May 11, 2006.

* cited by examiner

SYSTEM AND TECHNIQUE FOR CALIBRATING RADAR ARRAYS

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to radar systems and methods, and, more particularly, to a system and technique for calibrating a plurality of radars to allow coherent processing.

BACKGROUND OF THE INVENTION

As is known, a single radar system having a radar antenna, also referred to herein as a radar array, has a theoretical maximum processing gain and signal to noise ratio, each of which directly affects the ability of a radar to detect and to track a target. The maximum processing gain and the maximum signal to noise ratio are determined by a variety of radio characteristics, including but not limited to, a radar antenna size, a radar transmit and receive beamwidth, a type of received signal processing, a radar transmit power, and a radar receiver noise. Each of these characteristics is substantially fixed for any given radar system. Therefore, in order to improve detection and tracking performance, it has generally been necessary to design a new radar system having new characteristics.

Alternatively, it is possible to process together the received signals from a plurality of radars, each having a radar antenna, in order to increase processing gain, and therefore, to increase detection and tracking performance. In order to process together the received signals, i.e., the target echoes, from the plurality of radars, it is advantageous that received signals associated with each respective one of the plurality of radars be processed together at the same phase, i.e., coherently. It would also be advantageous if the processing gain provided by the plurality of radars approaches an ideal coherent processing gain. However, since the antennas of different ones of the plurality of radars are physically separated, the signals they receive as echoes from a target are generally not in phase, and therefore, do not combine coherently.

One of ordinary skill in the art will understand that knowledge of the relative position of the radar antennas of each respective one of the plurality or radars to within a small fraction of a wavelength of the received radar signals allows time delay (and phase) corrections in the transmitted and received signals to be made having sufficient accuracy to allow nearly ideal coherent processing. However, it is generally not sufficient that the position of the radar arrays merely be mechanically measured, since the distance between the radar arrays can be quite large compared to a radar signal wavelength, resulting in measurement inaccuracy. Furthermore, mobile radars are subject to changes in relative position much greater than a wavelength, and therefore, calibration of relative position would have to be performed each time the mobile radars are moved.

Also, radar systems can introduce relative time delay differences according to different time delays of their respective transmit and receive electronics, which can result in substantial time delay differences between radar systems, also resulting in lack of signal coherency between radars.

One of ordinary skill in the art will understand that calibrating the relative positions and relative time delay differences of a plurality of radar arrays is difficult and subject to increasing errors as the separation of the plurality of radars increases. It will also be understood that the calibration can be performed in a separate process, requiring time apart from actual operation of the radars.

SUMMARY OF THE INVENTION

The system and techniques of the present invention provide a calibration among a plurality of radar antenna arrays positioned in relatively close proximity to each other that allows coherent combination of signals associated with the plurality of radar arrays. The calibration simultaneously generates calibration factors for both the transmit and receive radar functions. The calibration accurately determines the relative location of the phase centers of the plurality of radar arrays, and the relative internal time delays among the plurality of radar systems, and provides calibration factors accordingly. The plurality of radar arrays can be controlled to cohere in any desired direction analogous to the way in which the subarrays in a single array would be controlled to steer that array in any desired direction. Accurately knowing the relative positions and relative time delays of the radar arrays allows subsequent application of relative time delays between radar arrays in order to cohere the radars in both transmit and receive modes.

In accordance with the present invention, a method of calibrating a plurality of radars includes selecting a reference radar from among the plurality of radars and selecting one or more pairs of radars, each one of the pairs of radars including the reference radar and a respective paired radar from among the plurality of radars. The method further includes identifying at least three targets, generating a first at least three target tracks associated with the at least three targets with the reference radar, and generating a second at least three target tracks associated with the at least three targets with the paired radar. The method relates the first at least three target tracks with the second at least three target tracks to provide a calibration indicative of a relative position and a relative time delay of the paired radar relative to the reference radar.

With this particular arrangement, the method provides the ability to coherently combine the plurality or radars with only a small amount of processing loss compared to an ideal coherent processing gain, and therefore, to better detect a target.

In accordance with another aspect of the present invention, a system for calibration of a plurality of radars includes a reference radar for transmitting a first radar signal, and a paired radar associated with the reference radar selected from among the plurality of radars for transmitting a second radar signal. A first radar track processor can be coupled to the reference radar for generating a first at least three target tracks, and a second radar track processor can be coupled to the paired radar for generating a second at least three target tracks. A track relating processor can be coupled to the first and second track processors for relating the first at least three target tracks generated by the first track processor with the second at least three target tracks generated by the second track processor. A simultaneous equation processor can be coupled to the track relating processor and adapted to further relate the first at least three target tracks to the second at least three target tracks to provide a calibration indicative of a relative position and a relative time delay of the paired radar relative to the reference radar. In one particular embodiment, the system further includes an averaging processor coupled to the simultaneous equation processor for averaging calibrations to provide an averaged calibration. In yet another embodiment, the system further includes a coherency processor coupled to the averaging processor, the first radar track processor, and the second radar track processor to relate the first at least three target tracks, the second at least three target tracks, and the averaged calibration to provide at least three cohered target tracks.

With this particular arrangement, the system provides the ability to coherently combine the plurality or radars with only a small amount of processing loss compared to an ideal coherent processing gain, and therefore, to better detect a target.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the system and method for calibrating radar arrays of the present invention, some introductory concepts and terminology are explained. As used herein, the term monostatic refers to operation of a single radar, in which the radar transmits a radar signal, the radar signal propagates to and echoes from a target, and the echo is received by the single radar. As used herein, the term bistatic refers to operation of more than one radar, for example first and second radars, in which the first radar transmits a radar signal, the radar signal propagates to and echoes from a target, and the echo is received by the second radar. As used herein, the term "radar array" refers to a radar antenna having a plurality of radar elements. However, the concepts used herein apply equally well to a radar antenna having any form of construction.

Figure 1:
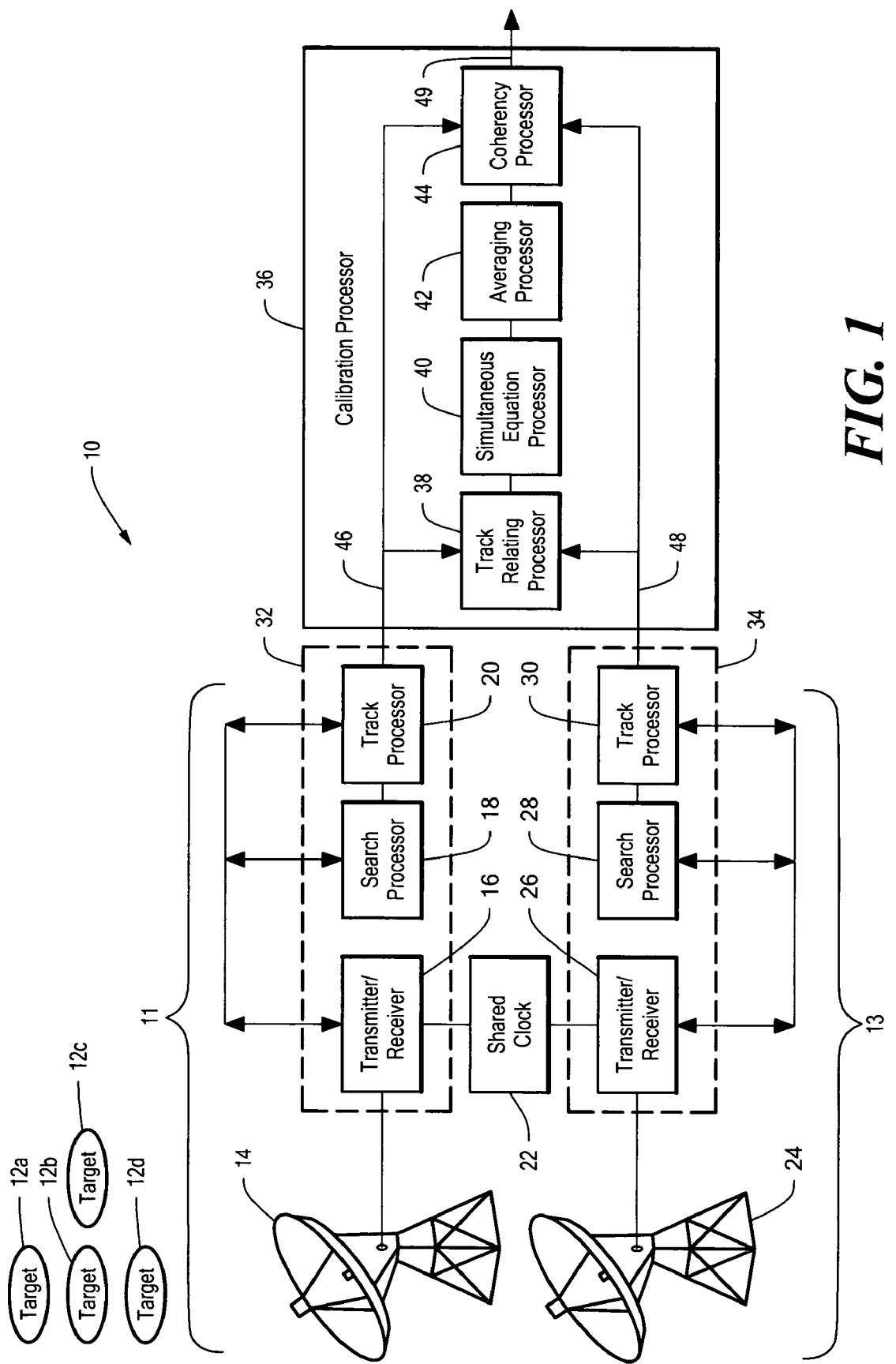
FIG. 1 is a block diagram of an exemplary radar array calibration system.

Referring now to FIG. 1, a system 10 for cohering two radar systems includes a first radar system 11, also referred to herein as a reference radar, having a first radar antenna 14, and a first radar electronics system 32. The first radar electronics system 32 includes a first transmitter/receiver 16, a first search processor 18, and a first track processor 20 for generating a first at least three target tracks 46. A second radar system 13, also referred to herein as a paired radar, includes a second radar antenna 24 and a second radar electronics system 34. The second radar electronics system 34 includes a second transmitter/receiver 26, a second search processor 28, and a second track processor 30 for generating a second at least three target tracks 48. In order to provide a relatively good phase coherency between the first and second radar systems, a shared clock 22 provides a clock reference to both of the radar electronic systems 32, 24.

The first and second radar systems 11, 13, respectively, can track a plurality of targets, here shown as four targets 12a–12d. In one particular embodiment, one or more of the targets 12a–12d are targets of opportunity, e.g., satellites and/or aircraft. However, in another embodiment, one or more of the targets 12a–12d are calibration targets, e.g., calibration spheres, intentionally fired into the air down range for the radar antennas 14, 24. Calibration spheres can be provided in a variety of configurations. In one particular embodiment, the calibration spheres are solid metal spheres, having a diameter of approximately two centimeters.

The first and second radar electronic systems 32, 34 provide the first and second at least three target tracks 46, 48, respectively, to a calibration processor 36 having a track relating processor 38 for relating the first at least three target tracks generated by the first track processor with the second at least three target tracks generated by the second track processor. In operation, the track relating processor 38 can establish that the first at least three target tracks 46 are from the same at least three targets as the second at least three target tracks 48. A simultaneous equation processor 40 further relates the first at least three target tracks 46 generated by the first track processor 20 with the second at least three target tracks 48 generated by the second track processor 30 to provide a calibration indicative of a relative position and a relative time delay of the paired radar 13 relative to the reference radar 11. In operation, the simultaneous equation processor 40 provides simultaneous equations, which, once solved, provide the calibration indicative of the relative position and the relative time delay. In one particular embodiment, the simultaneous equation processor 40 can provide at least first and second calibrations, each indicative of the relative position and the relative time delay.

In one particular embodiment, the calibration processor 36 also includes an averaging processor 42 for averaging at least the first and second calibrations to provide an averaged calibration.

A coherency processor 44 can combine the first and second target track data 46, 48 coherently using the calibrations provided by the averaging processor 42.

Operation of the calibration processor will be further understood from the description given in conjunction with figures below.

Figure 2:
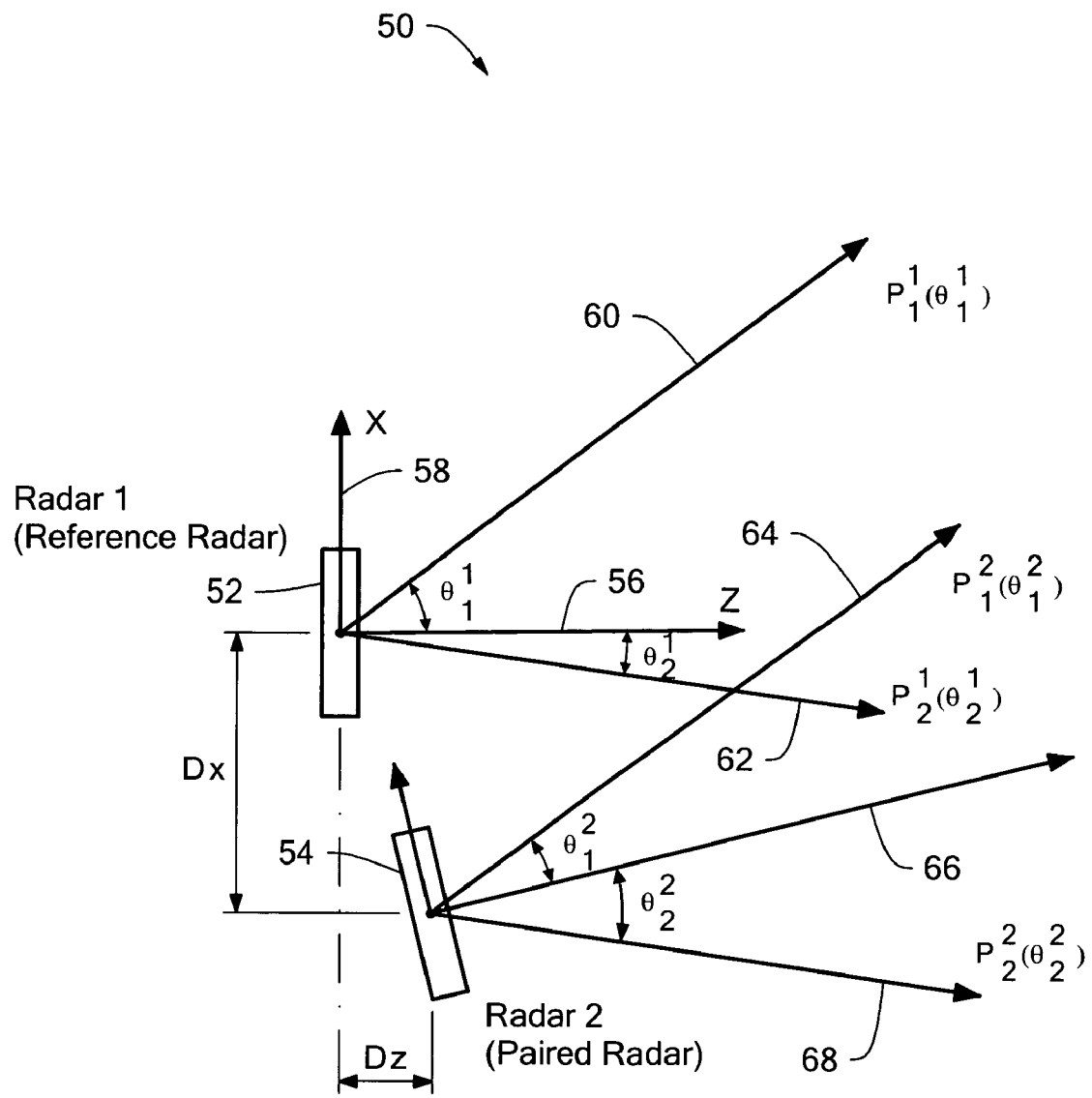
FIG. 2 is a pictorial of two radar arrays showing relative positions in two dimensions.

Referring now to FIG. 2, a reference radar 52 (also referred to herein as radar 1) can be the same as or different from the reference radar antenna 14 of FIG. 1, and a paired radar 54 (also referred to herein as radar 2) can be the same as or different from the paired radar antenna 24 of FIG. 1. The paired radar 54 is offset in position from the reference radar 52 along an X-axis 58 by an amount $D_x$ and along a Z-axis 56 by an amount $D_z$. The reference radar 52 has a phase center along the Z-axis 56 and the paired radar 54 has a phase center along an axis 66, which can be in the same direction or in a different direction than the Z-axis 56.

It will be understood that $D_x$ and $D_z$ correspond to but two of three dimensions in which the reference radar 52 can be offset from the paired radar 54. A third offset $D_y$ in a direction out of the page is not shown and is not included in equations below. However, one of ordinary skill in the art will understand how to expand the equations below to include the third dimension, $D_y$.

The reference radar 52 and the paired radar 54 are tracking two targets (not shown), a first target and a second target. Superscript 1 denotes the reference radar 52 and superscript 2 denotes the paired radar 54. Subscript 1 denotes the first target and subscript 2 denotes the second target. Therefore, more generally, $\theta_n^m$ denotes an angular position of a calibration sphere n as seen from radar m, and $P_n^m(\theta_n^m)$ denotes a position of the calibration sphere n relative to the radar m, where the position includes a range and the angle $\theta_n^m$. Vector 60 points from the reference radar 52 to the first target (not shown), and vector 62 points from the reference radar 52 to the second target (not shown). Similarly, vector 64 points from the paired radar 54 to the first target (not shown), and vector 68 points from the paired radar 54 to the second target (not shown).

As is known, a target track includes a range to a target, an elevation of the target, and an azimuth angle to the target at a variety of points in time. The derivations below are for a two-dimensional case having no target elevation. However, one of ordinary skill in the art will understand how to generate equations having a third dimension. For example, using the form of the equations below which include dimensions along the X-axis 58 and the Z-axis 56 and angles in an X-Z plane as shown, similar equations can also be generated, for example, having dimensions along the X-axis 58 and a Y-axis (not shown) including angles in an X-Y plane.

At a particular point in time, the distance, including internal delays, as seen from radar 1 to the first target is given by:

$$L_1^1 = |P_1^1(\theta_1^1)| + l_1, \quad \text{(Eq. 1)}$$

where $P_1^1(\theta_1^1)$ is the position of the first target relative to the reference radar, radar 1, (i.e., the vector 60 from the phase center of radar 1 to the first target), and $l_1$ is the sum of the internal transmit and receive delays in radar 1. At the same point in time, the distance as seen from radar 2 to the first target is given by:

$$L_1^2 = \left| P_1^1(\theta_1^1) - \begin{pmatrix} D_x \\ D_z \end{pmatrix} \right| + l_2, \quad \text{(Eq. 2)}$$

where $$\begin{pmatrix} D_x \\ D_z \end{pmatrix}$$

is the vector from the phase center of radar 1 to the phase center of radar 2 (the quantity we wish to determine). Expanding the expression for $L_1^2$ in terms of vector components:

$$L_1^2 = \sqrt{[P_{1x}^1(\theta_1^1) - D_x]^2 + [P_{1z}^1(\theta_1^1) - D_z]^2} + l_2 \quad \text{(Eq. 3)}$$

Expanding the squares under the radical, grouping terms, and realizing that $|P_1^1(\theta_1^1)|^2 = [P_{1x}^1(\theta_1^1)]^2 + [P_{1z}^1(\theta_1^1)]^2$, results in the following expression:

$$L_1^2 = |P_1^1(\theta_1^1)| \sqrt{1 + \frac{(D_x)^2 + (D_z)^2}{|P_1^1(\theta_1^1)|^2} - \frac{2D_x}{|P_1^1(\theta_1^1)|}\sin(\theta_1^1) - \frac{2D_z}{|P_1^1(\theta_1^1)|}\cos(\theta_1^1)} + l_2, \quad \text{(Eq. 4)}$$

where $$\frac{P_{1x}^1(\theta_1^1)}{|P_1^1(\theta_1^1)|} = \sin(\theta_1^1) \text{ and}$$

$$\frac{P_{1z}^1(\theta_1^1)}{|P_1^1(\theta_1^1)|} = \cos(\theta_1^1).$$

Taking the difference between $L_1^2$ and $L_1^1$ results in:

$$\Delta L_1 = L_1^2 - L_1^1 \quad \text{(Eq. 5)}$$
$$= |P_1^1(\theta_1^1)|\{\sqrt{A_1} - 1\} + \Delta l,$$

where $$A_1 = 1 + \frac{(D_x)^2 + (D_z)^2}{|P_1^1(\theta_1^1)|^2} - \frac{2D_x}{|P_1^1(\theta_1^1)|}\sin(\theta_1^1) - \frac{2D_z}{|P_1^1(\theta_1^1)|}\cos(\theta_1^1) \quad \text{(Eq. 6)}$$

$$\Delta l = l_2 - l_1 \quad \text{(Eq. 7)}$$

In the above expression, there are three unknowns ($D_x$, $D_z$, and $\Delta l$), with the rest of the parameters ($\Delta L_1$, $P_1^1(\theta_1^1)$, and $\theta_1^1$) derived from track data. By developing tracks on three different targets (index k below), a system of three simultaneous nonlinear equations can be defined as follows:

$$f_k(D_x, D_z, \Delta l) = 0, \; 1 \leq k \leq 3, \quad \text{(Eq. 8)}$$

where $$f_k(D_x, D_z, \Delta l) = \Delta L_k - |P_k^1(\theta_k^1)|\{\sqrt{A_k} - 1\} - \Delta l. \quad \text{(Eq. 9)}$$

Three resulting simultaneous equations are solved for $D_x$, $D_z$, and $\Delta l$, where $D_x$ and $D_z$ are referred to as position calibration factors and $\Delta l$ is referred to as a time delay calibration factor hereafter. The above equations can be generated a number of different times with different track points in the track history of the three targets, and the resulting set of solutions to the simultaneous equations can be averaged to increase accuracy in the estimates of $D_x$, $D_z$, and $\Delta l$.

It will be recognized that the three simultaneous equations are associated with three radar targets, however more targets can be used. It will be understood by one of ordinary skill in the art that in order to obtain the third dimension in a Y-axis (not shown) at least a fourth target is required.

As described above, the calibration provided by solutions to the simultaneous equations above can use targets of opportunity and/or calibration targets. When using targets of opportunity, it will be understood that the calibration can be performed from time to time without departing substantially from normal radar operation. The target tracks, which provide the range and angles used in the calibration, can be target tracks generated during normal radar system operation when tracking real targets.

While the above equations can be used to cohere two radars, by techniques described below, similar equations can be used to solve for relative positions and relative time delays associated with a plurality of radars and to cohere the plurality of radars together.

It should be appreciated that FIGS. 3–6 show flowcharts corresponding to the below contemplated technique which would be implemented in radar system 10 (FIG. 1). The rectangular elements (typified by element 102 in FIG. 3), herein denoted "processing blocks," represent computer software instructions or groups of instructions. The diamond shaped elements (typified by element 116 in FIG. 3), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 3:
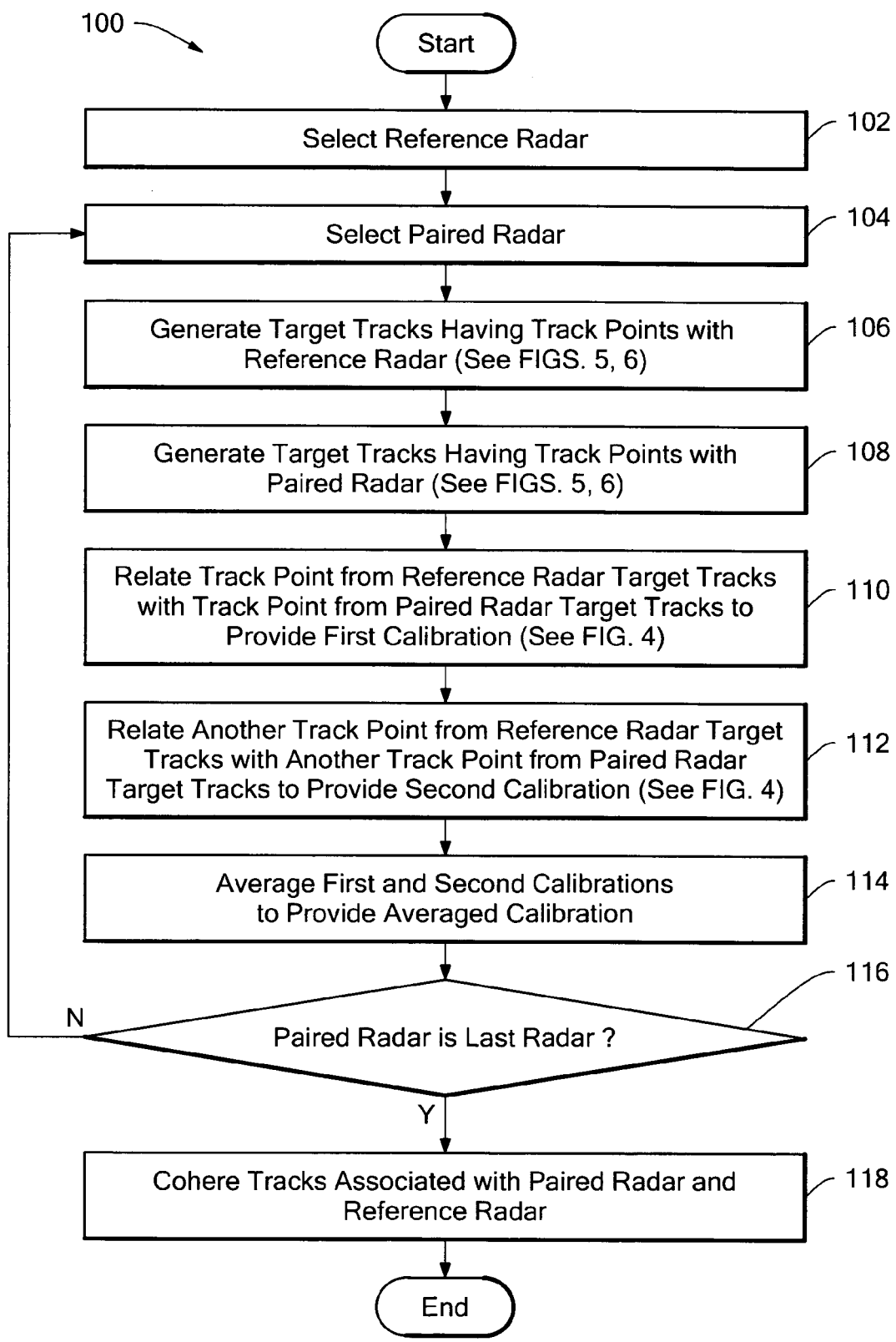
FIG. 3 is a flow chart showing a method of calibrating a plurality of radars.

Referring now to FIG. 3, a process 100 for cohering a plurality of radars using equations the same as or similar to those described above begins at block 102, where a reference radar is selected from among a plurality of radars. At block 104, a paired radar is selected from among the plurality of radars.

At block 106, target tracks are generated having track points with the reference radar.

Similarly, at block 108, target tracks are generated having track points with the paired radar. The reference radar and the paired radar selected in blocks 106 and 108 generate the target tracks for at least three targets (i.e., at least three target tracks each), the same at least three targets for each or the radars. As described above, the targets can be targets of opportunity or they can be calibration targets.

At block 110, first respective track points within each of the a first at least three target tracks from the reference radar are related to corresponding first respective track points within each of a second at least three target tracks from the paired radar to provide a first calibration indicative of a relative position and a relative time delay of the paired radar relative to the reference radar. The relating of block 110 corresponds, for example, to generating and solving simultaneous equations the same as or similar to those described above for respective track points associated with three or more targets providing position and time delay calibration factors. As described above, equations can be provided that allow geometric solutions in two physical dimensions as shown (plus a time delay), or also in three physical dimensions (plus a time delay). Three or more targets having a corresponding three of more target tracks can be used to generate the geometric solution having two dimensions (plus a time delay) and four or more targets having a corresponding four or more target tracks can be used to generated the geometric solution having three dimensions (plus a time delay).

At block 112, a second respective track point within each of the first at least three target tracks is related to a corresponding second respective track point within each of the second at least three target tracks to provide a second calibration indicative of the relative position and the relative time delay of the paired radar relative to the reference radar.

At block 114, the first and the second calibrations are averaged to provide an averaged calibration associated with the reference radar and with the paired radar selected at block 104. While first and second calibrations are provided at blocks 110 and 112 respectively, which are averaged at block 114, it should be appreciated that more than two calibrations can be provided, each associated with a respective track point within each of the first at least three target tracks and a corresponding second respective track point within each of the second at least three target tracks, and the more than two calibrations can be averaged.

One of ordinary skill in the art will understand that averaging a greater number of calibrations (i.e., calibration factors) provides a resulting averaged calibration having greater accuracy than a single calibration. However, in another embodiment, the averaging of block 114 can average only the first and second calibrations. In yet another alternate embodiment, the second calibration of block 112 and the averaging of block 114 are omitted and the first calibration of block 110 is the final calibration associated with the reference radar in combination with the paired radar selected at block 104.

At decision block 116, a determination is made as to whether the paired radar selected at block 104 is the last paired radar. If the paired radar is not the last paired radar, the process returns to block 104, where another paired radar is selected, retaining the reference radar selected at block 102, and the process repeats to generate an averaged calibration for the another paired radar at block 114.

If, at decision block 116, the paired radar is the last paired radar, the process continues to block 118, where the reference radar is cohered with one or more paired radars by using the corresponding averaged position calibration factors and the corresponding average time delay calibration factors provided at block 114.

Figure 4:
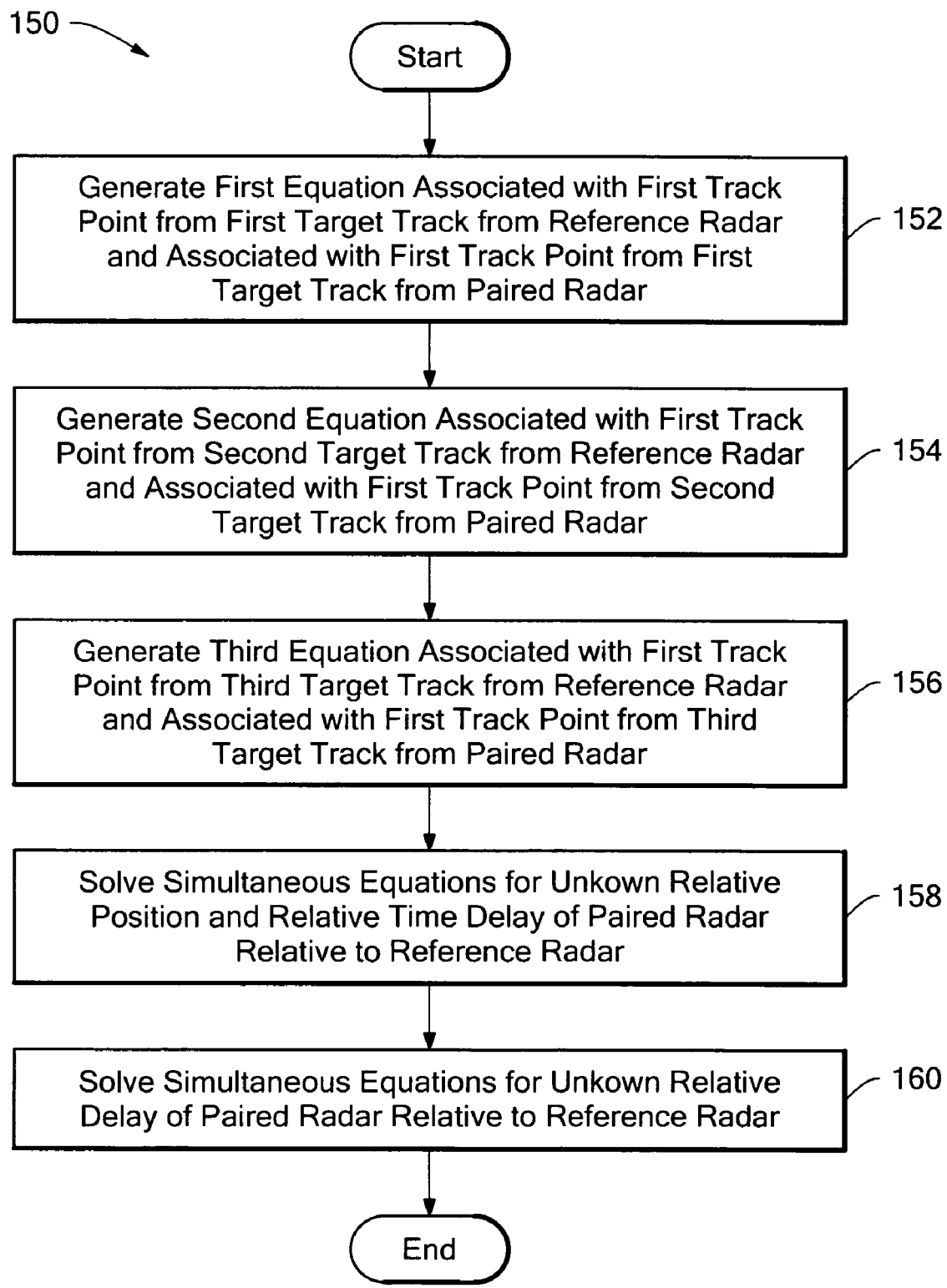
FIG. 4 is a flow chart showing in greater detail a portion of the method of FIG. 3.

Referring now to FIG. 4, a process 150 provides further detail associated with blocks 110 and 112 of FIG. 3. The processor 150 begins at block 152, where a first equation is generated in association with a first target. A first track point associated with the first target track of the first target from the reference radar and a first track point associated with the first target track of the first target for the paired radar are used.

At block 154, a second equation is generated in association with a second target. A first track point associated with the second target track of the second target from the reference radar and a first track point associated with the second target track of the second target for the paired radar are used.

At block 156, a third equation is generated in association with a third target. A first track point associated with the third target track of the third target from the reference radar and a first track point associated with the third target track of the third target for the paired radar are used.

While first track points are described above, it should be appreciated that on subsequent loops through the process 100 of FIG. 3, successive track points are used from the first, second and third target tracks associated with the first, second, and third targets for the reference radar and for the paired radar.

At block 158, the three simultaneous equations generated at blocks 152-156 are solved to provide position calibration factors indicative of the relative position of the paired radar relative to the reference radar. At block 160, the three simultaneous equations generated at blocks 152–156 are solved to provide a time delay calibration factor indicative of the relative time delay of the paired radar relative to the reference radar.

As described above, in conjunction with FIG. 2, at least three simultaneous equations associated with at least three targets are needed to provide position calibration factors in two geometric coordinates and a delay calibration factor. However, also as described above, in other embodiments, at least four simultaneous equations associated with at least four targets are needed to provide position calibration factors in three geometric coordinates and the delay calibration factor.

Figure 5:
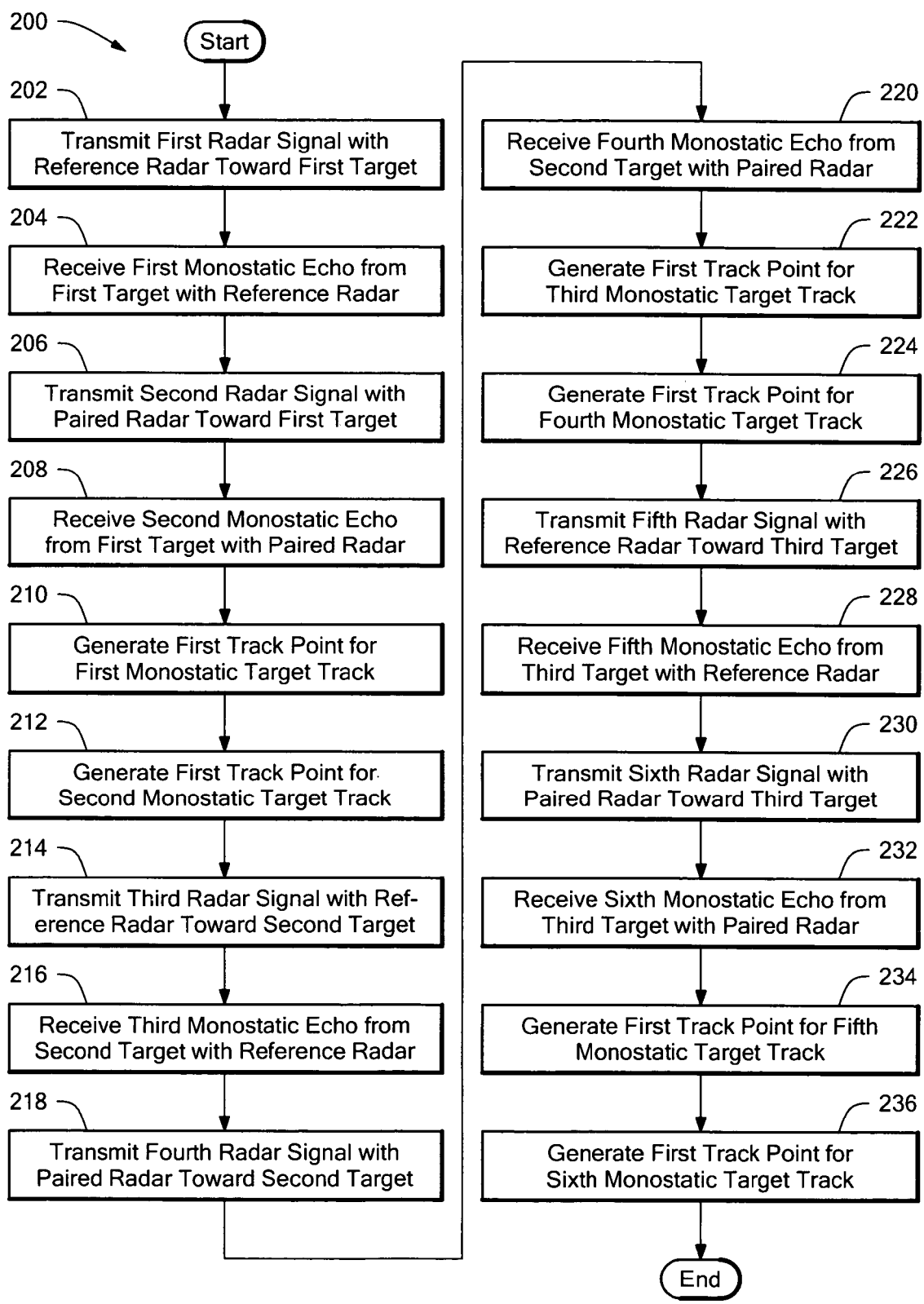
FIG. 5 is a flow chart showing in greater detail another portion of the method of FIG. 3.

Referring now to FIG. 5, a process 200 provides further detail associated with the generation of target tracks described above, for example in conjunction with boxes 106 and 108 of FIG. 3. The process begins at block 202, where a first radar signal is transmitted with a reference radar, for example with the reference radar 52 of FIG. 2, toward a first target. At block 204 a first monostatic echo is received, having bounced from the first target to the reference radar, providing a track point associated with a first monostatic target track.

At block 206, a second radar signal is transmitted with a paired radar, for example with the paired radar 54 of FIG. 2, toward the first target. At block 208 a second monostatic echo is received, having bounced from the first target to the paired radar, providing a track point associated with a second monostatic target track.

At block 210 a first track point associated with the first monostatic target track (first target) is generated, for example, by the reference radar, and at block 212 a first track point associated with the second monostatic target track (first target) is generated, for example, by the paired radar.

At block 214, a third radar signal is transmitted with a reference radar toward a second target. At block 216 a third monostatic echo is received, having bounced from the second target to the reference radar, providing a track point associated with a third monostatic target track.

At block 218, a fourth radar signal is transmitted with a paired radar toward the second target. At block 220 a fourth monostatic echo is received, having bounced from the first target to the paired radar, providing a track point associated with a fourth monostatic target track.

At block 222 a first track point associated with the third monostatic target track (second target) is generated, for example, by the reference radar, and at block 224 a first track point associated with the fourth monostatic target track (second target) is generated, for example, by the paired radar.

At block 226, a fifth radar signal is transmitted with the reference radar toward a third target. At block 228 a fifth monostatic echo is received, having bounced from the third target to the reference radar, providing a track point associated with a fifth monostatic target track.

At block 230, a sixth radar signal is transmitted with a paired radar toward the third target. At block 232 a sixth monostatic echo is received, having bounced from the first target to the paired radar, providing a sixth track point associated with a monostatic target track.

At block 234 a first track point associated with the fifth monostatic target track (third target) is generated, for example, by the reference radar, and at block 236 a first track point associated with the sixth monostatic target track (third target) is generated, for example, by the paired radar.

The process 200 can repeat to provide any number of track points in the six monostatic target tracks. While the process 200 uses three targets to generate monostatic target tracks, in other embodiments, more target tracks and more targets can be used to provide more than six monostatic target tracks.

In one particular embodiment, the first, third and fifth radar signals are orthogonal to the second, fourth and sixth radar signals. As used herein, orthogonal is used to refer to radar signals that are separable. For example, the first, third, and fifth radar signals can be at one frequency while the second, fourth, and sixth radar signals can be at another frequency. With this arrangement, the first and second radar signals can be simultaneously transmitted, as can be the third and fourth radar signals and the fifth and sixth radar signals, the pairs of signals directed at the first, second, and third targets, respectively.

Figure 6:
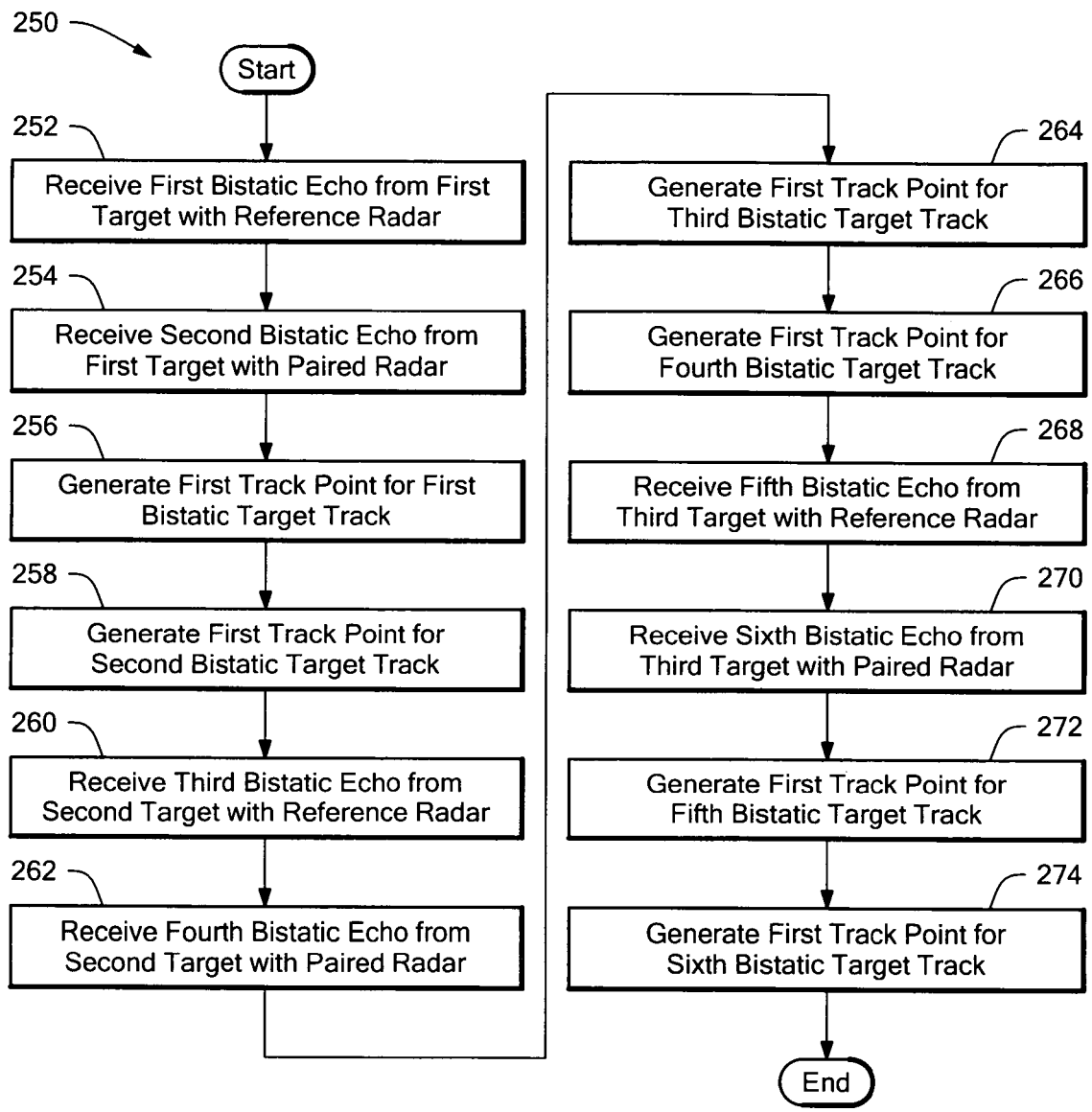
FIG. 6 is a flow chart showing in greater detail yet another portion of the method of FIG. 3.

Referring now to FIG. 6, a process 250 provides further detail associated with the generation of target tracks described above, for example in conjunction with boxes 106 and 108 of FIG. 3.

At block 252, in conjunction with the second radar signal transmitted by the paired radar at block 206 of FIG. 5, a first bistatic echo is received, having bounced from the first target to the reference radar, providing a track point associated with a first bistatic target track.

At block 254, in conjunction with the first radar signal transmitted by the reference radar at block 202 of FIG. 5, a second bistatic echo is received, having bounced from the first target to the paired radar, providing a track point associated with a second bistatic target track.

At block 256 a first track point associated with the first bistatic target track (first target) is generated, for example, by the reference radar, and at block 258 a first track point associated with the second bistatic target track (first target) is generated, for example, by the paired radar.

At block 260, in conjunction with the fourth radar signal transmitted by the paired radar at block 218 of FIG. 5, a third bistatic echo is received, having bounced from the second target to the reference radar, providing a track point associated with a third bistatic target track.

At block 262, in conjunction with the third radar signal transmitted by the reference radar at block 214 of FIG. 5, a fourth bistatic echo is received, having bounced from the second target to the paired radar, providing a track point associated with a fourth bistatic target track.

At block 264 a first track point associated with the third bistatic target track (second target) is generated, for example, by the reference radar, and at block 266 a first track point associated with the fourth bistatic target track (second target) is generated, for example, by the paired radar.

At block 268, in conjunction with the sixth radar signal transmitted by the paired radar at block 230 of FIG. 5, a fifth bistatic echo is received, having bounced from the third target to the reference radar, providing a track point associated with a fifth bistatic target track.

At block 270, in conjunction with the fifth radar signal transmitted by the reference radar at block 226 of FIG. 5, a sixth bistatic echo is received, having bounced from the third target to the paired radar, providing a track point associated with a sixth bistatic target track.

At block 272 a first track point associated with the fifth bistatic target track (third target) is generated, for example, by the reference radar, and at block 276 a first track point associated with the sixth bistatic target track (third target) is generated, for example, by the paired radar.

The process 250 can repeat to provide any number of track points in the six bistatic target tracks. As described in conjunction with FIG. 5, while the process 250 uses three targets to generate six bistatic target tracks, in other embodiments, more target tracks and more targets can be used to provide more than six bistatic target tracks.

It should be recognized that the six bistatic target tracks provide more tracks than are needed to generate and to solve the simultaneous equations described above in conjunction with FIG. 2. The bistatic target tracks cannot generally be used to provide additional calibration factors to be averaged with others, for example at step 114 of FIG. 3, since the bistatic target tracks provide equations that are not fully independent of the equations presented above in conjunction with FIG. 2. However, the bistatic target tracks can be used in a different way, for example, to provide, instead of one time delay calibration factor that accounts for time delay in transmit and receive together, separate time delay calibration factors for transmit and for receive.

As previously discussed, the calibration process proceeds by tracking the targets simultaneously with orthogonal radar signals, each paired radar taken one at a time with the reference radar. This process results in two simultaneous tracks in each radar; for each target, a monostatic target track and a bistatic target track. Let $S^{11}$ indicate a track file developed in radar 1 from receiving and processing the transmission from radar 1, $S^{21}$ indicate a track file developed in radar 2 from receiving and processing the transmission from radar 1, etc.

To Process $S^{11}$ & $S^{12}$

At a given point in time, the total path length from radar 1 to the first target and back again is given by:

$$L_1^{11} = 2|P_1^1(\theta_1^1)| + l_{T1} + l_{R1}, \quad \text{(Eq. 10)}$$

where $P_1^1(\theta_1^1)$ and $\theta_1^1$ are as previously defined in above, and $l_{T1}$ and $l_{R1}$ are the internal transmit and receive path delays, respectively, in radar 1. At the same point in time, the total path length from radar 2 to the first target, and then to radar 1 is given by:

$$L_1^{12} = |P_1^1(\theta_1^1)| + \left|P_1^1(\theta_1^1) - \begin{pmatrix} D_x \\ D_z \end{pmatrix}\right| + l_{T2} + l_{R1} \quad \text{(Eq. 11)}$$

The difference in total path length between the two paths is:

$$\Delta L_1 = L_1^{12} - L_1^{11} \quad \text{(Eq. 12)}$$
$$= |P_1^1(\theta_1^1)|\{\sqrt{A_1} - 1\} + l_{T2} - l_{T1}$$

The above expression for ΔL has four unknowns, $D_x$, $D_z$, $l_{T2}$, and $l_{T1}$. ΔL and $\theta_1^1$ are derived from the track data. By processing the track history on multiple calibration spheres, multiple solutions can be developed for the above unknowns, with the results averaged to reduce random errors.

To Process $S^{21}$ & $S^{22}$ $$L_1^{22} = 2\left|P_1^1(\theta_1^1) - \begin{pmatrix} D_x \\ D_z \end{pmatrix}\right| + l_{T2} + l_{R2} \quad \text{(Eq. 13)}$$

$$L_1^{21} = |P_1^1(\theta_1^1)| + \left|P_1^1(\theta_1^1) - \begin{pmatrix} D_x \\ D_z \end{pmatrix}\right| + l_{T1} + l_{R2} \quad \text{(Eq. 14)}$$

-continued $$\Delta L = L_1^{22} - L_1^{21} \quad \text{(Eq. 15)}$$
$$= |P_1^1(\theta_1^1)|\{\sqrt{A_1} - 1\} + l_{T2} - l_{T1}$$

Note that processing $S^{21}$ & $S^{22}$ produces estimates of $D_x$, $D_z$, $l_{T2}$, and $l_{T1}$ the same as attained from processing $S^{11}$ & $S^{12}$. Since both estimates are independent (in terms of corrupting errors), the two estimates can be averaged to further reduce random errors.

To Process $S^{11}$ & $S^{22}$ $$L_1^{11} = 2|P_1^1(\theta_1^1)| + l_{T1} + l_{R1} \quad \text{(Eq. 16)}$$

$$L_1^{22} = 2\left|P_1^1(\theta_1^1) - \begin{pmatrix} D_x \\ D_z \end{pmatrix}\right| + l_{T2} + l_{R2} \quad \text{(Eq. 17)}$$

$$\Delta L = L_1^{22} - L_1^{11} \quad \text{(Eq. 18)}$$
$$= 2|P_1^1(\theta_1^1)|\{\sqrt{A_1} - 1\} + l_{T2} - l_{T1} + l_{R2} - l_{R1}$$

The above expression has four unknowns, $D_x$, $D_z$, $l_{R1}$, and $l_{R2}$; $l_{T1}$ and $l_{T2}$ were determined above. Note that $S^{11}$ and $S^{22}$ were used previously to determine $D_x$ and $D_z$, hence processing the difference between $L_1^{22}$ and $L_1^{11}$ will not yield independent estimates of $D_x$ and $D_z$. Processing $S^{11}$ and $S^{22}$ is useful for estimating $l_{R1}$, and $l_{R2}$. Note that if the previously described processing for $S^{11}$, $S^{12}$ and $S^{21}$, $S^{22}$ is to be done, the transmit and receive actions between radar 1 and radar 2 need to be calibrated to a small fraction of a wavelength. If the above calibration cannot be achieved to the required degree of accuracy, then $S^{11}$ and $S^{22}$ can be processed as described above, adding additional measurement points to produce more simultaneous equations to solve for the additional unknowns.

An error analysis associated with the above-described techniques can be performed.

Only monostatic returns are used in the error analyses described below. First, radar tracking errors that affect the accuracy of the calibration process are described. Then, an analysis of radar measurement errors is described, wherein the radar measurement errors include both the radar tracking errors and also effects due to a relative position of the three targets.

With regard to radar tracking errors, the calibration techniques described above employ two parameters derived from radar track data: the difference in the range from each radar to a target, and the angular position of the target with respect to a reference coordinate system with origin at the phase center of the array and X-axis normal to the face of the array. Estimates of calibration algorithm performance are based on radar measurement and tracking error models described below.

Wideband range tracks are implemented in a radar system with modem ranging techniques. Non-linear Monte Carlo calibration performance predictions presented below use a conservative wideband range track error of 0.01 wavelengths.

In evaluating the effect of angle error, two sources of error are considered. First, signal to noise (SNR) dependent error results from the effects of receiver thermal noise on individual radar monopulse measurement. The standard deviation of radar angle computation in a single look (non-averaged) measurement is given by:

$$\sigma_\theta = \frac{\theta_{BW}}{k\sqrt{2SNR}},\quad \text{(Eq. 19)}$$

where $\theta_{BW}$ is a basic angular resolution of the monopulse measurement (generally taken to be the 3 dB Sum channel beamwidth), and k is a monopulse slope. To represent a large modem radar, the error analysis below uses a conservative estimate of 70 μradians as the standard deviation of the radar angle computation.

Another major component of angle error considered in the calibration analysis below is error associated with the radar inertial navigation system (INS). An INS on each radar determines the orientation of the radar face with respect to an inertial reference, such as a local north, east, up frame (Radar Reference Coordinate (RRC) System in a typical radar). The RRC frame is used in a radar as the track reference frame (i.e., the filtered track states are output in this frame). Track updates are performed in a polar frame with origin fixed to the face of the array (the RUV frame, which is characterized by parameters R, U, and V, where R is the slant range to the object, and U and V are the sine space angular position of the object). The propagated states are therefore transformed to the RUV frame before update. This transformation must go through the angles that define the orientation of the array relative to the local navigation frame, these angles being those returned by the INS unit on each array. In performing the calibration analysis herein, it has been assumed that the INS errors are in the form of a bias error. This assumption is consistent with an operational concept wherein each radar is in a fixed position, with the INS measurements at the time of deployment used to determine the position of the array face. Since the position of each radar is determined with respect to one of the radars chosen as the reference radar, the individual bias errors do not enter into the above-described simultaneous equations; only the range measurement of each radar relative to the reference is used in the equations. The position of each radar is determined with respect to the same reference radar, so that the INS bias error in each radar does not impact the time delay required to cohere each radar relative to the reference.

Calibration errors that result as a function of target positions, i.e., calibration sphere deployment, and the radar errors discussed above, can be evaluated via Monte Carlo computer simulations using, for example, the Newton-Rapson method of solving a set of nonlinear simultaneous equations. In performing the analysis, 1σ Gaussian distributed angle track errors of 70 μradians, and 1σ Gaussian distributed range track errors of 0.01 wavelengths (λ) were used (X-Band having λ=0.03 meters was used).

Figure 7:
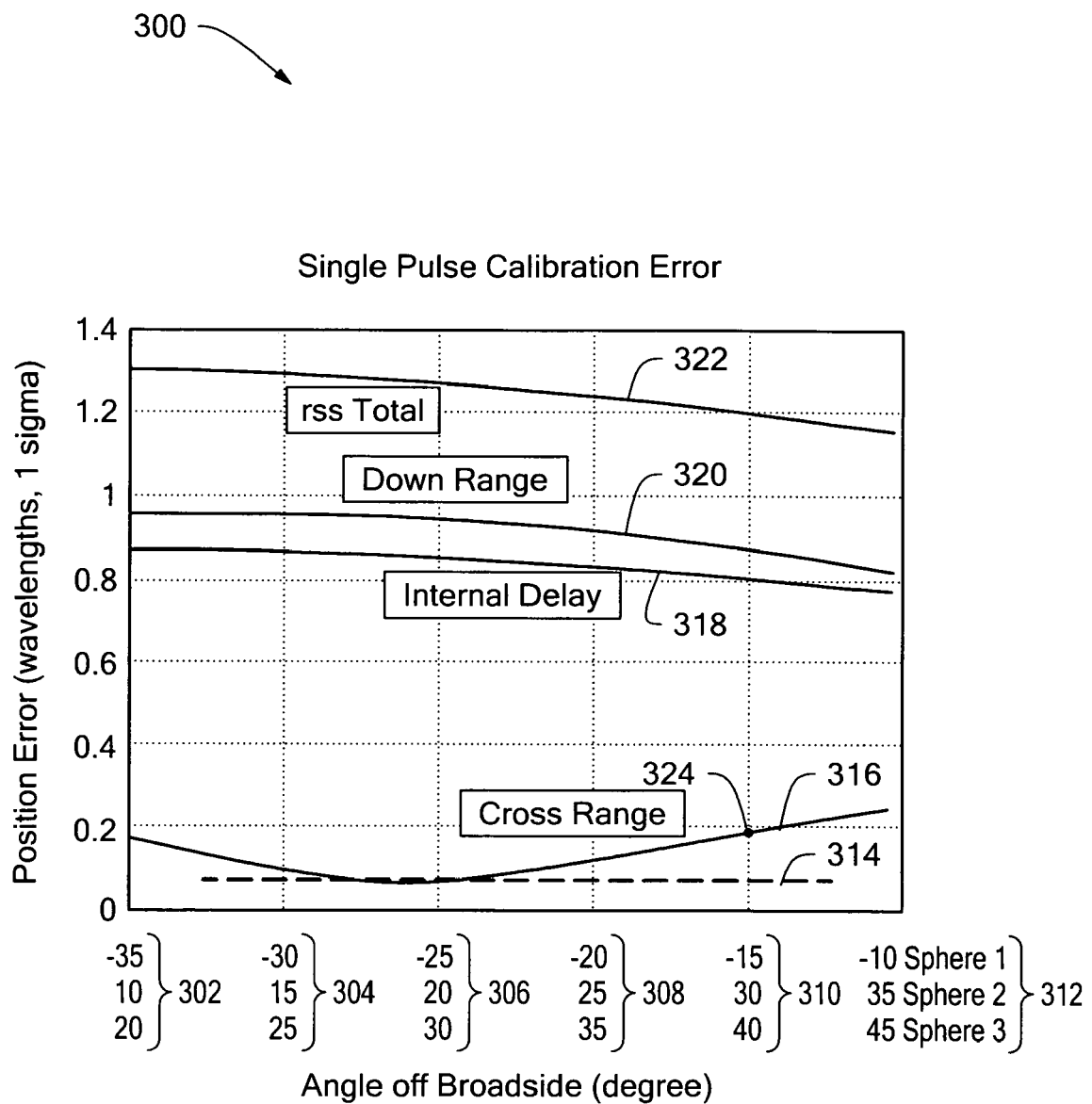
FIG. 7 is a graph showing calculated position error between two radars when using calibration targets (spheres) separated by fifty-five degrees.

Referring now to FIG. 7, a graph 300 includes a vertical scale corresponding to position error in units of radar signal wavelength for a relative position calculation of two radars according to the above-described system and techniques using the above-described radar errors. A horizontal scale corresponds to angular position of three targets, denoted as sphere 1, sphere 2, and sphere 3, relative to a broadside aspect of an antenna array. The three targets are used as described above, to generate calibration factors. Six exemplary target positions 302–312 are shown, each having a total angular spread between the three targets of fifty-five degrees. It will be appreciated that, for each of the exemplary target positions 302–312, the targets have the same relative angular positions, but different angular positions relative to array broadside. The graph 300 corresponds to a two-dimensional configuration, as shown, for example, in FIG. 2.

A first curve 314 corresponds to a desired largest total calculated position error of about 0.0718 wavelengths. The curve 314 is selected in accordance with a desired small amount of processing gain loss, for example, 0.1 dB, that would be achieved when the two radars are coherently combined, for example by the cohering processor 44 of FIG. 1 and in block 118 of FIG. 3.

Curves 316–322 are generated by simulations, wherein points on the curves are associated with the target positions 302–312. For example, a point 324 on the curve 316 corresponds to a cross range position error achieved by the above system and technique when used in conjunction with targets at the positions 310. Curves 316–322 correspond to position errors that would be achieved without averaging, e.g., without the averaging provided in block 114 of FIG. 3.

The curve 316 corresponds to cross range position errors, i.e., $D_x$ (FIG. 2) that would be achieved by the above described system and techniques. The curve 320 corresponds to down range position errors, i.e., $D_z$ (FIG. 2). The curve 318 corresponds to internal time delay errors, i.e., $l_1$, as used in equations described above in conjunction with FIG. 2. The curve 322 corresponds to a root-sum-squared combination of the errors of curves 316–320, and corresponds to a total expected resulting position error. It can be seen that the curve 322 represents substantially more error than the curve 314 corresponding to the desired total error.

In the particular simulation illustrated by the graph 300, the two radars have a relative cross range position, $D_x$, of 20 meters, a relative down range position, $D_z$, of 3 meters, a relative internal delay corresponding to a position error of 0.1 meters, and a range to three calibration spheres of approximately 60 km, having the exemplary relative target positions 302–312.

Calibration sphere characteristics, including range, can be selected to produce a desired signal to noise ratio on a single measurement, for example, of at least 30 dB. With calibration spheres of known electrical properties being used with radars of known power-aperture, a calculation can be done to determine a desired range to the calibration spheres for calibration. A shorter range, resulting in a larger signal to noise ratio, is acceptable, so long as a dynamic range of the radar is not exceeded and so long as the range is sufficiently great that the calibration spheres are in the far field of the largest radar. Targets of opportunity are selected in a similar way.

By averaging more than one solution corresponding to different sets of simultaneous equations, for example, as described in conjunction with block 114 of FIG. 3, a resulting total position error approaches zero as the number of averages increases (assuming the error mean is an unbiased estimator of the relative positions). A variance of the error mean influences the number of required solutions that must be averaged to achieve the desired calibration accuracy, for example the desired calibration accuracy of the curve 314.

As described above, the desired calibration error shown as curve 314 is 0.0718 wavelengths to provide a processing loss no greater 0.1 dB when the two radars are coherently combined. However, without averaging, for the exemplary relative target positions 302–312, worst-case rss position error, shown in the curve 322, is 1.3 wavelengths, substantially more than desired. As known to one of ordinary skill in the art, for solutions having noise, accuracy improves inversely with the square root of the number of solutions averaged. A number of averaged solutions to meet the desired accuracy is, therefore, $$\left(\frac{1.3}{0.0718}\right)^2 = 328,$$

associated with 328 track points along each of three monostatic target tracks (three targets) for each of the two radars. Resulting estimated calibration time is 1.57 seconds using a 100% radar time line, a calibration sphere range of 60 km, a maximum uneclipsed pulse, and 3 calibration spheres.

Figure 8:
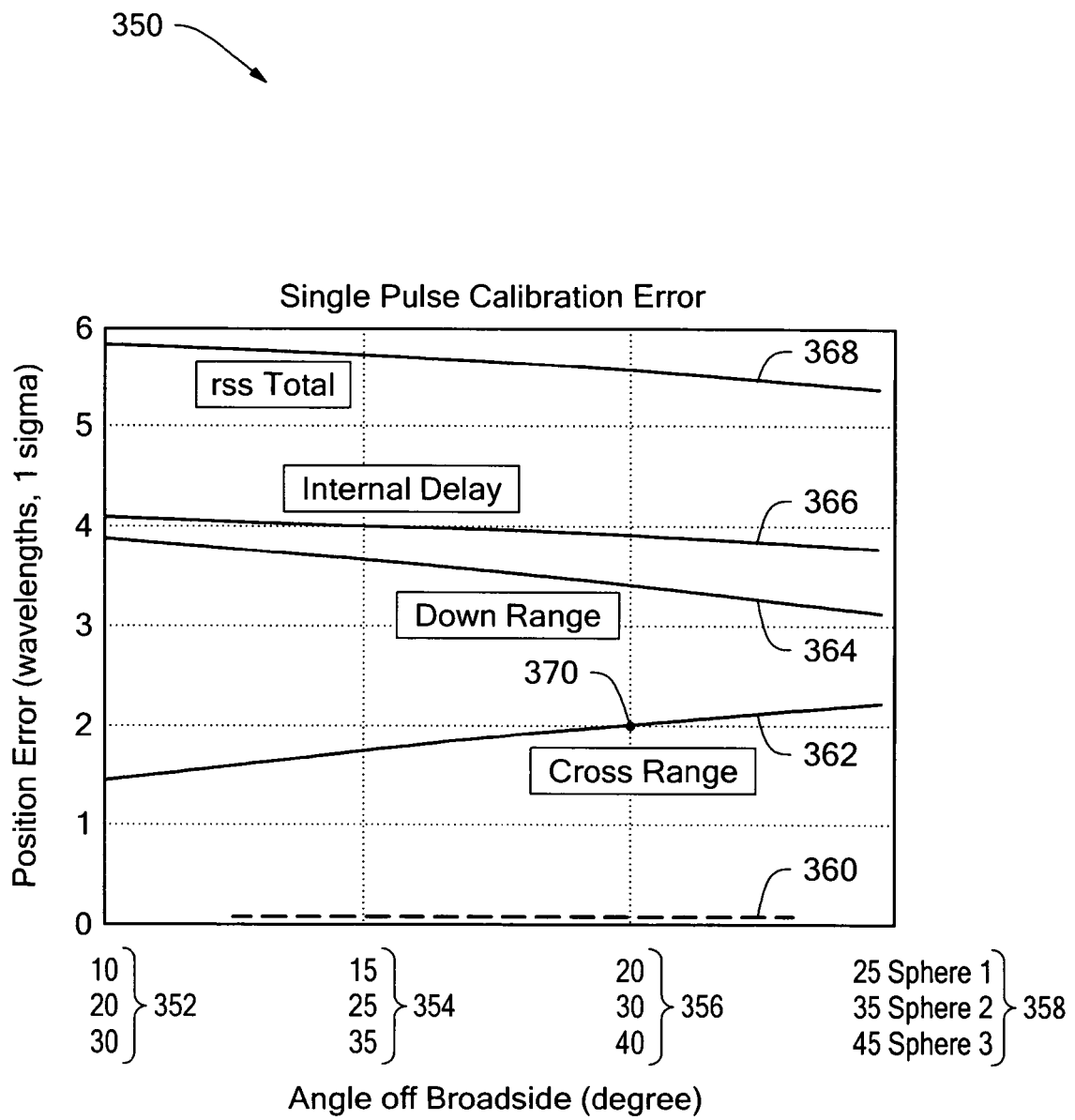
FIG. 8 is a graph showing calculated position error between two radars when using calibration targets separated by twenty degrees.

Referring now to FIG. 8, a graph 350 includes a vertical scale corresponding to position error in units of radar signal wavelength for a relative position calculation of two radars according to the above-described system and techniques using the above-described radar errors. A horizontal scale corresponds to angular position of three targets, denoted as sphere 1, sphere 2, and sphere 3, relative to a broadside aspect of an antenna array. The three targets are used as described above, to generate calibration factors. Four exemplary target positions 352–358 are shown, each having a total angular spread between the three targets of twenty degrees, substantially less than the angular spread of the targets used in the example of FIG. 7. It will be appreciated that, for each of the exemplary target positions 352–358, the targets have the same relative angular positions, but different angular positions relative to array broadside. The graph 350 corresponds to a two-dimensional configuration, as shown, for example, in FIG. 2.

A first curve 360 corresponds to the desired largest total calculated position error of about 0.0718 wavelengths described above in conjunction with FIG. 7. The curve 360 is selected in accordance with a relatively small amount of processing gain loss, for example, 0.1 dB, that would be achieved when the two radars are coherently combined, for example by the cohering processor 44 of FIG. 1 and in block 118 of FIG. 3.

Curves 362–368 are generated by simulations, wherein points on the curves are associated with the target positions 352–358. For example, a point 370 on the curve 362 corresponds to a cross range position error achieved by the above system and technique when used in conjunction with targets at the positions 356. Curves 362–368 correspond to position errors that would be achieved without averaging, e.g., without the averaging provided in block 114 of FIG. 3.

The curve 362 corresponds to cross range position errors, i.e., $D_x$ (FIG. 2) that would be achieved by the above described system and techniques. The curve 364 corresponds to down range position errors, i.e., $D_z$ (FIG. 2). The curve 366 corresponds to internal time delay errors, i.e., $l_1$, as used in equations described above in conjunction with FIG. 2. The curve 368 corresponds to a root-sum-squared combination of the errors of curves 362–366, and corresponds to a total expected resulting position error. It can be seen that the curve 368 represents substantially more error than the curve 360 corresponding to the desired total error.

As described above, by averaging more than one solution corresponding to different sets of simultaneous equations, for example, as described in conjunction with block 114 of FIG. 3, a resulting total position error approaches zero as the number of averages increases. A variance of the error mean influences the number of required solutions that must be averaged to achieve the desired calibration accuracy, for example the desired calibration accuracy of the curve 360.

In the particular example illustrated by the graph 350, the two radars have a relative cross range position, $D_x$, of 20 meters, a relative down range position, $D_z$, of 3 meters, a relative internal delay corresponding to a position error of 0.1 meters, and a range to three calibration spheres of approximately 60 km, having the exemplary relative target positions 352–358.

As described above, the desired calibration error shown as curve 360 is 0.0718 wavelengths to provide a processing loss no greater 0.1 dB when the two radars are coherently combined. However, without averaging, for the exemplary relative target positions 352–358, worst-case rss position error, shown in the curve 368, is 5.8 wavelengths, substantially more than desired and substantially more than indicated by the curve 322 of FIG. 7. As known to one of ordinary skill in the art, for solutions having noise, accuracy improves inversely with the square root of the number of solutions averaged. A number of averaged solutions to meet the desired accuracy is, therefore, $$\left(\frac{5.8}{0.0718}\right)^2 = 6,525,$$

associated with 6,525 track points along each of three monostatic target tracks (three targets) for each of the two radars. Resulting estimated calibration time is 32 seconds using a 100% radar time line, a calibration sphere range of 60 km, a maximum uneclipsed pulse, and 3 calibration spheres.

It should be recognized that the unaveraged rss error of curve 368, for which the three targets were within an angular spread of twenty degrees is substantially higher than the unaveraged rss error of curve 322 of FIG. 7, for which the three targets were within an angular spread of fifty-five degrees. As a result, more solutions must be averaged to achieve the desired position error, requiring a substantially longer calibration time. Therefore, it will be understood that the angular spread of the targets can be selected in accordance with a desired maximum calibration time.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of calibrating a plurality of radars, comprising;
   selecting a reference radar from among the plurality of radars;
   selecting one or more pairs of radars, each one of the pairs of radars including the reference radar and a respective paired radar from among the plurality of radars;
   identifying at least three targets;
   generating a first at least three target tracks associated with the at least three targets with the reference radar;
   generating a second at least three target tracks associated with the at least three targets with the paired radar; and
   relating the first at least three target tracks with the second at least three target tracks to provide a calibration indicative of a relative position and a relative time delay of the paired radar relative to the reference radar.

2. The method of claim 1, wherein the relating comprises:
generating a first equation associated with a first track point within a first one of the first at least three target tracks and associated with a first track point within a first one of the second at least three target tracks;
generating a second equation associated with a first track point within a second one of the first at least three target tracks and associated with a first track point within a second one of the second at least three target tracks;
generating a third equation associated with a first track point within a third one of the first at least three target tracks and associated with a first track point within a third one of the second at least three target tracks; and
solving at least the first, second and third equations simultaneously to provide the calibration indicative of the relative position of the paired radar relative to the reference radar.

3. The method of claim 2, further including:
solving at least the first, second and third equations simultaneously to provide the calibration indicative of the relative time delay of the paired radar relative to the reference radar, wherein the relative time delay is a total time delay including a sum of a relative transmit time delay and a relative receive delay.

4. The method of claim 2, further including:
solving at least the first, second and third equations simultaneously to provide the calibration indicative of the relative time delay of the paired radar relative to the reference radar, wherein the relative time delay includes a relative transmit time delay and a relative receive delay.

5. The method of claim 1, wherein the calibration is indicative of a relative position of the paired radar relative to the reference radar in at least two dimensions.

6. The method of claim 1, wherein the calibration is indicative of a relative position of the paired radar relative to the reference radar in at least three dimensions.

7. The method of claim 1, wherein the relating the first at least three target tracks with the second at least three target tracks comprises relating a first respective track point within each of the fast at least three target tracks with a corresponding first respective track point within each of the second at least three target tracks to provide a first calibration indicative of the relative position and the relative time delay of the paired radar relative to the reference radar.

8. The method of claim 7, further including:
relating a second respective track point within each of the first at least three target tracks with a corresponding second respective track point within each of the second at least three target tracks to provide a second calibration indicative of the relative position and the relative time delay of the paired radar relative to the reference radar; and
averaging the first calibration with at least the second calibration to provide an averaged calibration.

9. The method of claim 1, wherein the generating the first at least three target tracks comprises generating a respective monostatic target track associated with each of the at least three targets with the reference radar and the generating the second at least three target tracks comprises generating a respective monostatic target track associated with each of the at least three targets with the paired radar.

10. The method of claim 1, wherein the generating the first at least three target tracks comprises generating a respective monostatic target track and a respective bistatic target track associated with each of the at least three targets with the reference radar and the generating the second at least three target tracks comprises generating a respective monostatic target track and a respective bistatic target track associated with each of the at least three targets with the paired radar.

11. The method of claim 1, further including:
transmitting a first radar signal with the reference radar; and
transmitting a second radar signal with the paired radar, wherein the first radar signal is orthogonal to the second radar signal.

12. The method of claim 11, wherein the first radar signal and the second radar signal are transmitted concurrently.

13. The method of claim 1, wherein the selecting one or more pairs of radars results in each of the plurality of radars being included in a respective pair of radars.

14. The method of claim 1, wherein the at least three targets include a first, second, and third target and the generating the respective target track for each of the reference radar and the respective paired radar and for each of the at least three targets comprises:
transmitting a first radar signal with the reference radar toward the first target;
receiving a first monostatic target echo from the first target associated with the first radar signal with the reference radar;
transmitting a second radar signal with the paired radar toward the first target;
receiving a second monostatic target echo from the first target associated with The second radar signal with the paired radar;
generating a first track point for a first monostatic target track associated with the first monostatic target echo;
generating a first track point for a second monostatic target track associated with the second monostatic target echo;
transmitting a third radar signal with the reference radar toward the second target;
receiving a third monostatic target echo from the second target associated with the third radar signal with the reference radar;
transmitting a fourth radar signal with the paired radar toward the second target;
receiving a fourth monostatic target echo from the second target associated with the fourth radar signal with the paired radar;
generating a first track point associated with a third monostatic target track associated with the third monostatic target echo;
generating a first track point associated with a fourth monostatic target track associated with the fourth monostatic target echo;
transmitting a fifth radar signal with the reference radar toward the third target;
receiving a fifth monostatic target echo from the third target associated with the fifth radar signal with the reference radar;
transmitting a sixth radar signal with the paired radar toward the third target;
receiving a sixth monostatic target echo from the third target associated with the sixth radar signal with the paired radar;
generating a first track point associated with a fifth monostatic target track associated with the fifth monostatic target echo; and
generating a first tack point associated with a sixth monostatic target track associated with the sixth monostatic target echo.

15. The method of claim 14, wherein the first radar signal is orthogonal to the second radar signal, the third radar signal is orthogonal to the fourth radar signal, and the fifth radar signal is orthogonal to the sixth radar signal.

16. The method of claim 14, wherein the first radar signal is transmitted concurrently with the second radar signal, the third radar signal is transmitted concurrently with the fourth radar signal, and the fifth radar signal is transmitted concurrently with the sixth radar signal.

17. The method of claim 14, further including:
receiving a first bistatic target echo from the first target associated with the first radar signal with the reference radar;
receiving a second bistatic target echo from the first target associated with the second radar signal with the paired radar;
generating a first track point for a first bistatic target track associated with the first bistatic target echo;
generating a first track point for a second bistatic target track associated with the second bistatic target echo;
receiving a third bistatic target echo from the second target associated with the third radar signal with the reference radar;
receiving a fourth bistatic target echo from the second target associated with the fourth radar signal with the paired radar;
generating a first track point associated with a third bistatic target track associated with the third bistatic target echo;
generating a first track point associated with a fourth bistatic target tack associated with the fourth bistatic target echo;
receiving a fifth bistatic target echo from the third target associated with the fifth radar signal with the reference radar;
receiving a sixth bistatic target echo from the third target associated with the sixth radar signal with the paired radar;
generating a first track point associated with a fifth bistatic target track associated with the fifth bistatic target echo; and
generating a first track point associated with a sixth bistatic target track associated with the fourth bistatic target echo.

18. The method of claim 1, wherein the at least three targets include at least three calibration targets adapted to provide the calibration.

19. The method of claim 1, wherein the at least three targets include at least one calibration target adapted to provide the calibration.

20. The method of claim 1, wherein the at least three targets include at least one target of opportunity.

21. The method of claim 1, wherein at least two of the at least three targets are located at a relative azimuthal angle of at least twenty degrees within the field of view of each of the plurality of radars.

22. The method of claim 1, wherein at least two of the at least three targets are located at a relative azimuthal angle of at least fifty-five degrees within the field of view of each of the plurality of radars.

23. The method of claim 1, wherein at least three of the at least three targets are located at mutually relative angles of at least twenty degrees within the field of view of each of the plurality of radars.

24. The method of claim 1, wherein at least three of the at least three targets are located at mutually relative angles of at least fifty-five degrees within the field of view of each of the plurality of radars.

25. A system for calibration of a plurality of radars, comprising:
a reference radar to transmit a first radar signal;
a paired radar associated with the reference radar selected from among the plurality of radars to transmit a second radar signal;
a first radar track processor coupled to the reference radar to generate a first at least three target tracks;
a second radar track processor coupled to the paired radar to generate a second at least three target tracks;
a track relating processor coupled to the first and second track processors to relate the first at least three target tracks generated by the first track processor with the second at least three target tracks generated by the second track processor; and
a simultaneous equation processor coupled to the track relating processor and adapted to further relate the first at least three target tracks to the second at least three target tracks to provide a calibration indicative of a relative position and a relative time delay of the paired radar relative to the reference radar.

26. The system of claim 25, wherein the simultaneous equation processor is adapted to relate the first at least three target tracks to the second at least three target tracks to provide first and second calibrations, each indicative of the relative position and the relative time delay of the paired radar relative to the reference radar.

27. The system of claims 26, wherein the relative time delay is a total time delay including a sum of a relative transmit time delay and a relative receive delay.

28. The system of claims 26, wherein the relative time delay includes a relative transmit time delay and a relative receive delay.

29. The system of claim 26, further including an averaging processor coupled to the simultaneous equation processor to avenge the first and second calibrations to provide an averaged calibration.

30. The system of claim 29, further including a coherency processor coupled to the averaging processor, the first radar track processor, and the second radar track processor to relate the first at least three target tracks, the second at least three target tracks, and the averaged calibration to provide at least three cohered target tracks.

31. The system of claim 25, wherein the first radar signal is orthogonal to the second radar signal.

32. The system of claim 31, wherein the first radar signal is transmitted concurrently with the second radar signal.

33. The system of claim 25, further including at least three calibration targets, each calibration target associated with a respective one of the first at least three target tracks and with a respective one of the second at least three target tracks.

* * * * *

UNITED STATES PATENT AND TRADEMARK OFFICE
CERTIFICATE OF CORRECTION

PATENT NO. : 7,183,969 B2
APPLICATION NO. : 11/022028
DATED : February 27, 2007
INVENTOR(S) : Pozgay et al.

It is certified that error appears in the above-identified patent and that said Letters Patent is hereby corrected as shown below:

Column 1, line 55 delete "or radars" and replace with --of radars--.

Column 7, line 27 delete "stated the" and replace with --stated, the--.

Column 7, line 42 delete "each or the" and replace with --each of the--.

Column 7, line 46 delete "the a first" and replace with --the first--.

Column 7, line 60 delete "three of more" and replace with --three or more--.

Column 7, line 63 delete "generated" and replace with --generate--.

Column 9, line 20 delete "block 204 a" and replace with --block 204, a--.

Column 9, line 26 delete "block 208 a" and replace with --block 208, a--.

Column 9, line 30 delete "block 210 a" and replace with --block 210, a--.

Column 9, line 32 delete "block 212 a" and replace with --block 212, a--.

Column 9, line 36 delete "block 216 a" and replace with --block 216, a--.

Column 9, line 41 delete "block 220 a" and replace with --block 220, a--.

Column 9, line 45 delete "block 222 a" and replace with --block 222, a--.

Column 9, line 47 delete "block 224 a" and replace with --block 224, a--.

Column 9, line 52 delete "block 228 a" and replace with --block 228, a--.

Column 9, line 57 delete "block 232 a" and replace with --block 232, a--.

Column 9, line 61 delete "block 234 a" and replace with --block 234, a--.

Column 9, line 63 delete "block 236 a" and replace with --block 236, a--.

UNITED STATES PATENT AND TRADEMARK OFFICE
CERTIFICATE OF CORRECTION

PATENT NO. : 7,183,969 B2
APPLICATION NO. : 11/022028
DATED : February 27, 2007
INVENTOR(S) : Pozgay et al.

It is certified that error appears in the above-identified patent and that said Letters Patent is hereby corrected as shown below:

Column 10, line 30 delete "block 256 a" and replace with --block 256, a--.

Column 10, line 32 delete "block 258 a" and replace with --block 258, a--.

Column 10, line 45 delete "block 264 a" and replace with --block 264, a--.

Column 10, line 47 delete "block 266 a" and replace with --block 266, a--.

Column 10, line 60 delete "block 272 a" and replace with --block 272, a--.

Column 10, line 62 delete "block 276 a" and replace with --block 276, a--.

Column 11, line 33 delete "are as previously defined in above," and replace with --are as previously defined above,--.

Column 14, lines 20-21 delete "above described" and replace with --above-described--.

Column 14, line 61 delete "greater 0.1 dB" and replace with --greater than 0.1 dB--.

Column 15, lines 50-51 delete "above described" and replace with --above-described--.

Column 16, line 10 delete "greater 0.1 dB" and replace with --greater than 0.1 dB--.

Column 17, line 41 delete "fast" and replace with --first--.

Column 18, line 29 delete "The" and replace with --the--.

Column 18, line 46 delete "mono" and replace with --mono- --.

Column 18, line 65 delete "tack" and replace with --track--.

Column 19, line 31 delete "tack" and replace with --track--.

Column 20, line 36 delete "claims 26," and replace with --claim 26,--.

UNITED STATES PATENT AND TRADEMARK OFFICE
CERTIFICATE OF CORRECTION

PATENT NO.       : 7,183,969 B2
APPLICATION NO.  : 11/022028
DATED            : February 27, 2007
INVENTOR(S)      : Pozgay et al.

It is certified that error appears in the above-identified patent and that said Letters Patent is hereby corrected as shown below:

Column 20, line 40 delete "claims 26," and replace with --claim 26,--.

Signed and Sealed this

Twenty-ninth Day of April, 2008

JON W. DUDAS
*Director of the United States Patent and Trademark Office*